United States Patent
Choo et al.

(10) Patent No.: US 7,564,559 B2
(45) Date of Patent: Jul. 21, 2009

(54) MEMS-BASED, PHASE-SHIFTING INTERFEROMETER

(75) Inventors: Hyuck Choo, Albany, CA (US); Richard S. Muller, Kensington, CA (US); David Garmire, El Cerrito, CA (US); James W. Demmel, Berkeley, CA (US); Rishi Kant, Stanford, CA (US)

(73) Assignee: The Regents of the University of California, Oakland, CA (US)

( * ) Notice: Subject to any disclaimer, the term of this patent is extended or adjusted under 35 U.S.C. 154(b) by 352 days.

(21) Appl. No.: 11/446,552

(22) Filed: Jun. 2, 2006

(65) Prior Publication Data

US 2007/0279638 A1    Dec. 6, 2007

(51) Int. Cl.
*G01B 9/02* (2006.01)
*G01L 1/24* (2006.01)

(52) U.S. Cl. .................................... 356/450; 356/35.5

(58) Field of Classification Search ............... 356/35.5, 356/511–514, 450; 359/290, 291, 295
See application file for complete search history.

(56) References Cited

U.S. PATENT DOCUMENTS

| | | | |
|---|---|---|---|
| 5,680,214 A * | 10/1997 | Lamb et al. | 356/514 |
| 6,643,025 B2 * | 11/2003 | Degertekin et al. | 356/505 |
| 6,765,680 B2 * | 7/2004 | Carr et al. | 356/510 |
| 7,068,377 B2 * | 6/2006 | Degertekin et al. | 356/511 |
| 7,233,400 B2 * | 6/2007 | Ueki | 356/497 |
| 7,417,784 B2 * | 8/2008 | Sasagawa et al. | 359/291 |
| 2002/0163648 A1 * | 11/2002 | Degertekin et al. | 356/499 |
| 2003/0184761 A1 * | 10/2003 | Degertekin et al. | 356/511 |
| 2006/0098208 A9 * | 5/2006 | Degertekin et al. | 356/511 |
| 2006/0126077 A1 * | 6/2006 | Ueki et al. | 356/512 |

* cited by examiner

*Primary Examiner*—Patrick J Connolly
(74) *Attorney, Agent, or Firm*—Joseph R. Baker, Jr.; Gavrilovich Dodd & Lindsey LLP

(57) ABSTRACT

Provided herein are optical devices fabricated to include a reflective surface, actuators and stress-relieving structures. Systems containing such devices, and methods of manufacturing such devices, are also provided.

6 Claims, 8 Drawing Sheets

MEMS-BASED, PHASE-SHIFTING INTERFEROMETER

The invention was funded in part by Grant Nos. EIA-0122599 awarded by the National Science Foundation and by Grant No. EEC-0318642 awarded by the National Science Foundation. The government may have certain rights in the invention.

TECHNICAL FIELD

This invention relates to micro electromechanical systems (MEMS) and phase-shifting interferometry. The present invention further relates to methods of fabricating and using such systems.

BACKGROUND

An interferometric wavefront sensor employing phase-shift interferometry typically consists of a light source that is split into two wavefronts (e.g., a measurement and test wavefront) that are later recombined after traveling different path lengths (e.g., reference and test/measurement arms). Phase-shifting interferometry (PSI) can be used to accurately determine the phase differences and, for example, the corresponding profile of the surface under examination. With PSI, the optical interference pattern is recorded for each of multiple phase-shifts between the reference and measurement wavefronts to produce a series of optical interference patterns that span at least a full cycle of optical interference (e.g., from constructive, to destructive, and back to constructive interference). The optical interference patterns define a series of intensity values for each spatial location of the pattern, wherein each series of intensity values has a sinusoidal dependence on the phase-shifts with a phase-offset equal to the phase difference between the combined measurement and reference wavefronts for that spatial location. The phase-shifts in PSI can be produced by changing the optical path length from the measurement surface to the interferometer relative to the optical path length from the reference surface to the interferometer.

While PSI is an established method for measuring a variety of physical parameters, current systems are generally unsuitable for performing fast, continuous measurements of transient optical phenomena such as chemical diffusion, crystal growth, and measurements of rapidly varying object temperatures. Accordingly, phase-shifting interferometers incorporating micro-machined components, in conjunction with innovative phase-shifting techniques, are needed to rapidly and continuously measure transient phenomena.

SUMMARY

Provided herein are optical devices fabricated to include a reflective surface, actuators and stress-relieving structures. Systems containing such devices, and methods of manufacturing such devices, are also provided. Accordingly, in one embodiment, the optical device includes a reflective layer configured to receive at least a portion of pulsed input light from a source and a base associated with a transducer and flexibly connected to the reflective layer by flexures. The device further includes an actuator operably associated with the reflective layer and the base and a stress modulation structure integrally associated with the reflective layer. In general, the stress modulation structure is configured to modulate surface non-uniformity associated with the reflective layer.

In another embodiment, a system for generating and detecting interferometric patterns is provided. The system includes an optical device and a light source configured to direct pulsed input light to the reflective layer of the optical device. The system also includes a controller operably associated with the optical device and the light source. In general, the controller is configured to synchronize a light pulse emission from the light source with the resonant frequency of the optical device reflective layer. The system further includes a beam splitter configured to separate pulsed input light from the light source in to pulsed input light incident on reflective layer of the optical device and the surface of a test object and a detector assembly configured to capture interference patterns generated by the light received from the optical device and the test object.

In yet another embodiment, a method for generating surface profile information for a test object is provided. The method includes directing input light from a pulsed light source to 1) a reflective layer of an optical device configured to receive at least a portion of the light; and 2) the surface of a test object. The method further includes moving the reflective layer at resonant frequency synchronized with the periodicity of the pulsed light. The method also includes detecting light reflected from the reflective layer and the test object and generating an interference pattern from the detected light. In some embodiments, the method includes synchronizing detector assembly acquisition of reflected light with the resonant motion of the reflective layer. Interference pattern images can be used to generate surface profile information about the test object.

The details of one or more embodiments of the disclosure are set forth in the accompanying drawings and the description below. Other features, objects, and advantages will be apparent from the description and drawings, and from the claims.

BRIEF DESCRIPTION OF DRAWINGS

Like reference symbols in the various drawings indicate like elements.

DETAILED DESCRIPTION

Embodiments described below include interferometric systems capable of rapidly capturing profile measurements of transient phenomena. The systems incorporate an optical device adapted to produce phase shifts by synchronously resonating with periodically emitted electromagnetic radiation, such as light from a pulsed light source. The optical device incorporates a reflective layer configured to include stress modulating structures that substantially facilitate the maintenance of surface uniformity of the reflective layer. Methods of manufacturing such optical devices are also provided.

Figure 1A:
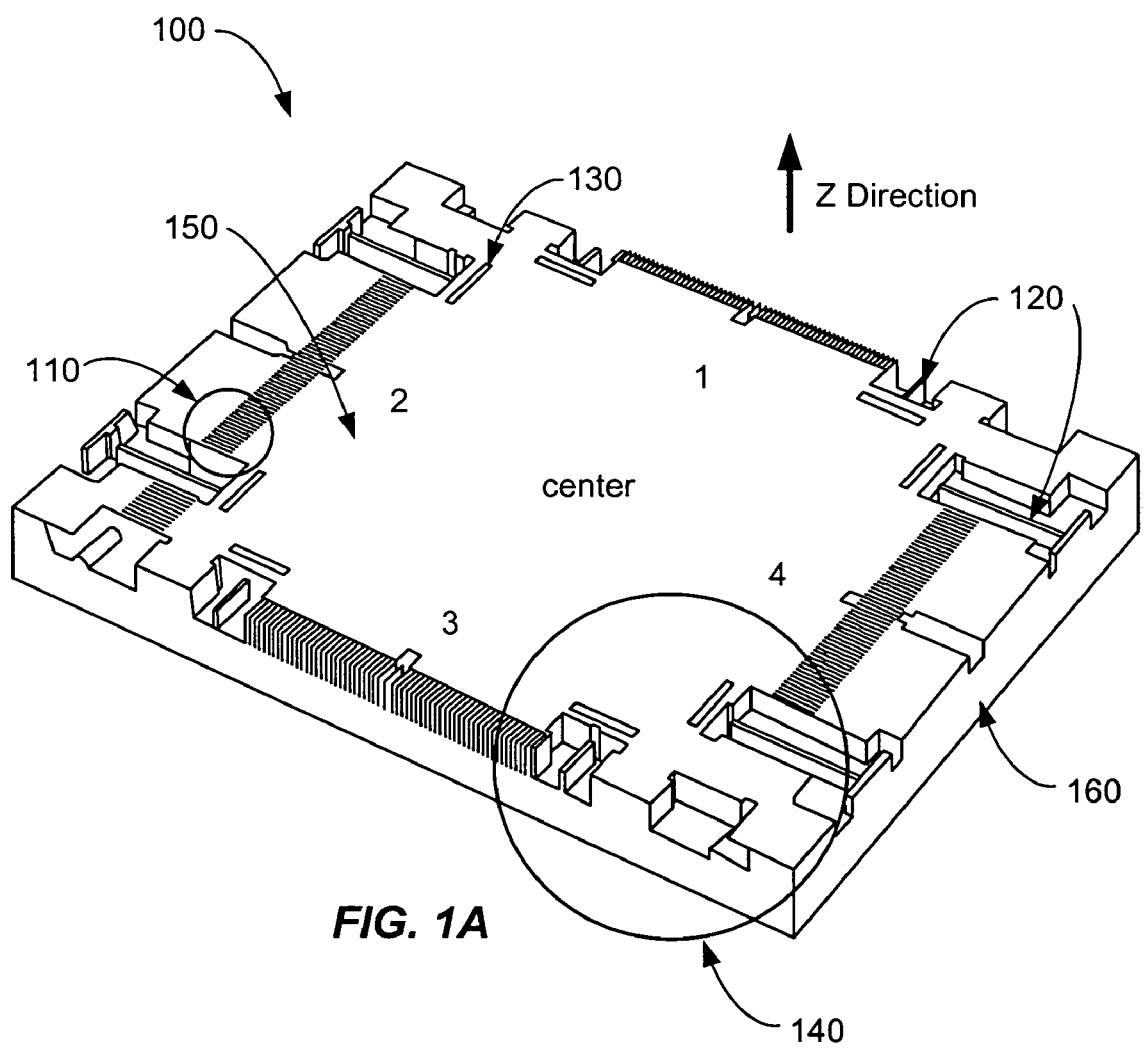
FIG. 1A is a diagram depicting an exemplary optical device.

Referring to FIG. 1A, optical device 100 is configured to include actuators 110 operably associated with reflective layer 150 and base 160. Reflective layer is flexibly connected to base 160 by flexures 120. Base includes a transducer for applying force to actuators 110. Actuators 110 can be electrostatic, electromagnetic, piezoelectric, electrothermal, and/or any combination thereof. Exemplary actuators include electrostatic comb actuators and vertical zip actuators. An SEM image of area 140 is shown in additional detail in FIG. 1B.

Figure 1B:
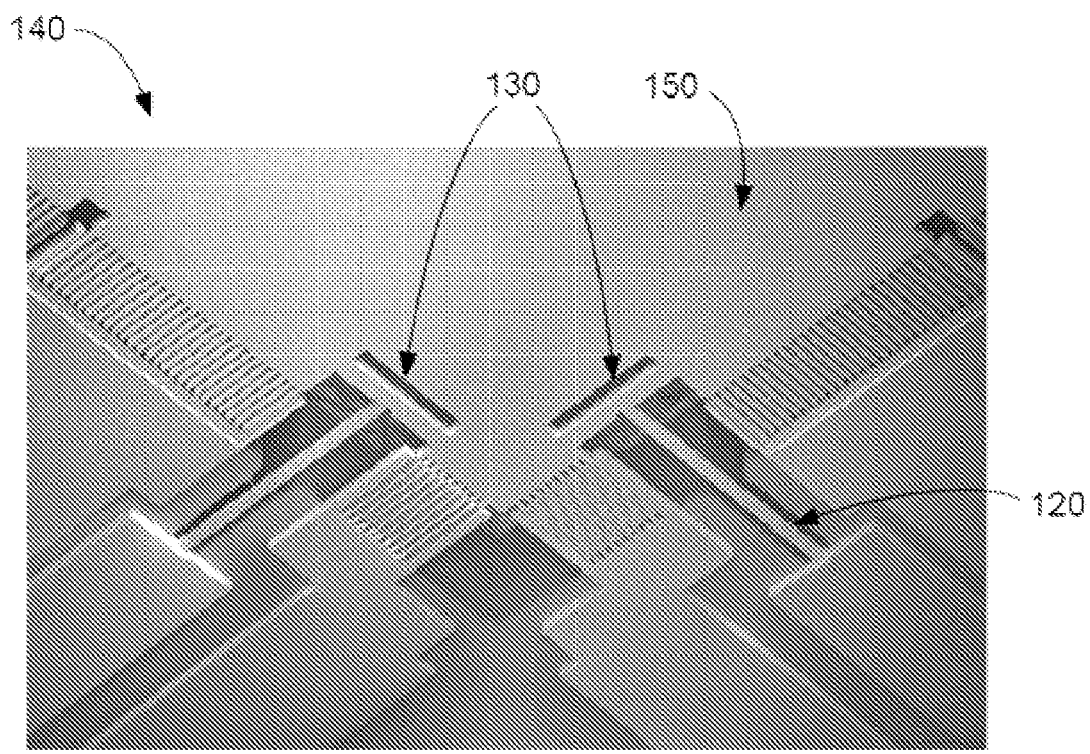
FIG. 1B is a scanning electron microscopy (SEM) image depicting selected areas of an exemplary optical device.

Intrinsic residual tensile stress can develop during the fabrication of silicon on insulator (SOI) wafers resulting in a decrease in surface uniformity (e.g., flatness) of devices derived from SOI wafers. Optical devices that include reflective elements can be fabricated using SOI wafers and processed using bulk/thin film micromachining techniques. As described in more detail below, the optical device can be structurally modified to compensate for non-uniformity in the reflective element associated with the device. Referring again to FIG. 1A, optical device 100 is configured to include stress modulation structure 130 integrally associated with reflective layer 150. Structure 130 is adapted to mitigate tensile and/or compressive stress that can develop between silicon oxide and silicon crystals. Referring to FIG. 1B, stress modulating structure 130 is depicted as a rectangular beam. However, it is understood that structure 130 can be designed to accommodate any configuration suitable for reducing tensile stress associated with reflective layer 150 processing.

In addition to reducing tensile and/or compressive stress associated with reflective layer processing, stress modulating structure 130 can be positioned in proximity to flexures 120 to facilitate reduction of dynamic deformation of reflective layer 150 during operation of optical device 100. Accordingly, referring to FIG. 1A and FIG. 1B, structure 130 is positioned between flexure 120 and reflective surface. During operation, vertical motion of reflective layer 150 is partially controlled flexures 130. Dynamic deformation of reflective layer resulting from flexure bending can be alleviated by structure 130. Notwithstanding the exemplary position of structure 130 depicted in FIG. 1A and FIG. 1B, it is understood that each point of contact between flexure and reflective surface can be adapted to accommodate multiple stress modulating structures. Accordingly, the position and design of the stress modulating structure is not limited to the specific pattern exemplified in FIG. 1A and FIG. 1B.

Figure 1C:
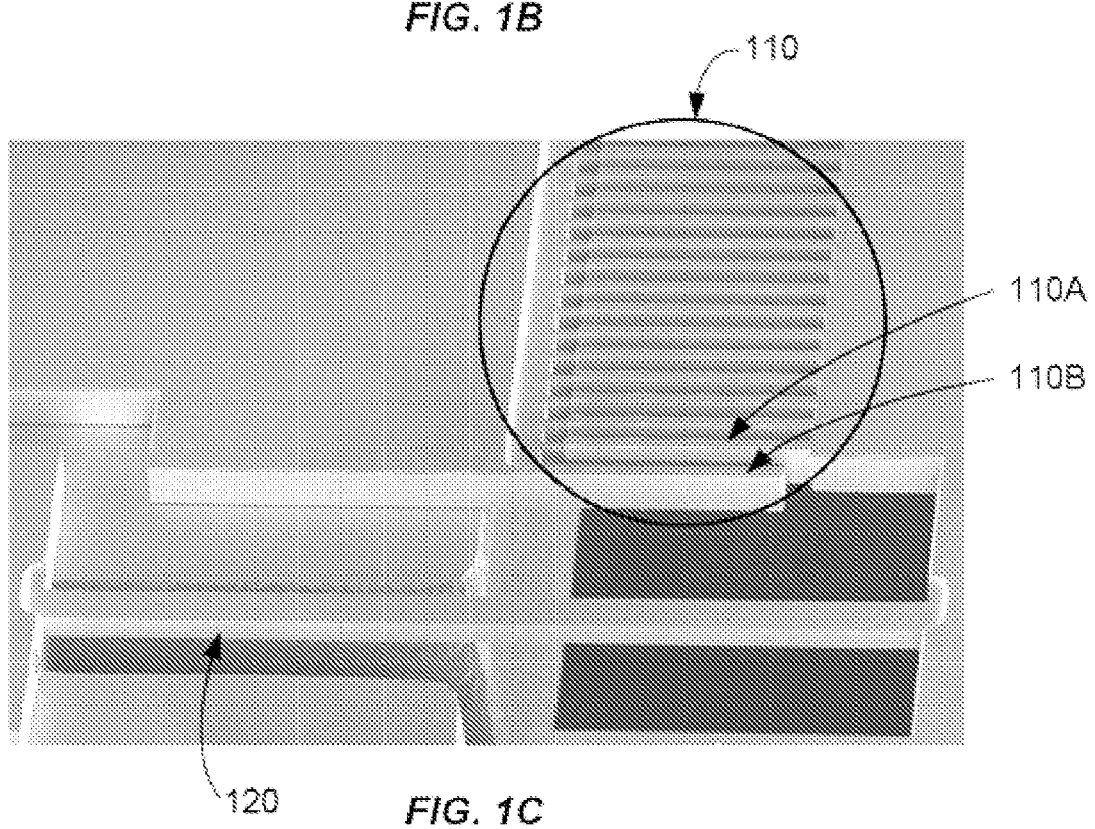
FIG. 1C is a scanning electron microscopy (SEM) image depicting selected areas of an exemplary optical device.

As previously noted, base 160 includes a transducer for applying force to actuator 110. An exemplary actuator configuration is provided in FIG. 1C. Referring to FIG. 1C, actuator 110 can be configured to include movable comb fingers 110A (see also FIG. 2F) integrally associated with reflective layer and stationary comb fingers 110B (see also FIG. 2F) integrally associated with base. During operation of the optical device a voltage can be applied to stationary comb fingers 110B with respect to grounded movable comb fingers 110A resulting in transient levitation of the reflective layer. In this example, the distribution of electrical field lines is asymmetric around the movable comb finger 110A. Referring again to FIG. 1A, the force resulting from operation of actuator 110 results in an upward levitation force applied in the z-direction for reflective layer 150. Since reflective layer 150 is flexibly anchored to base by flexures, the equilibrium position for reflective layer 150 may be determined by a balance between the electrostatic levitation force, the flexure force, and the gravity force of the suspended mass.

Design parameters used to determine the electrostatic vertical force include the width of the comb fingers, the thickness of the comb fingers, the gaps between fingers, the position of the moving comb finger, and the vertical gap between the structures and the substrate. The mechanical folded beam suspension spring constant is determined by the dimensions of the flexures and the number of folds. Beneath the suspended reflective layer, a capacitive pad can be designed for vertical position sensing using a parallel plate configuration.

The voltage-deflection response of the reflective layer can be modeled by techniques known to the skilled artisan. For example, Maxwell 2-D, an electrostatic finite element code, can be used to calculate the electrostatic forces on one comb finger at voltages ranging from 2 to 20 V and levitation displacement from about 0.5 to 4 µm.

An exemplary equation that can be used to calculate discrete data points for levitation heights at different applied voltages includes:

$$F_e(d, v) = F_g + F_s(d)$$

where $F_e$ is the electrostatic force, $F_g$ is the gravitational force, $F_s$ is the suspension force, and d is the levitation height. The flexure constant and resulting suspension force can be calculated by equations known to the skilled artisan.

Figure 1D:
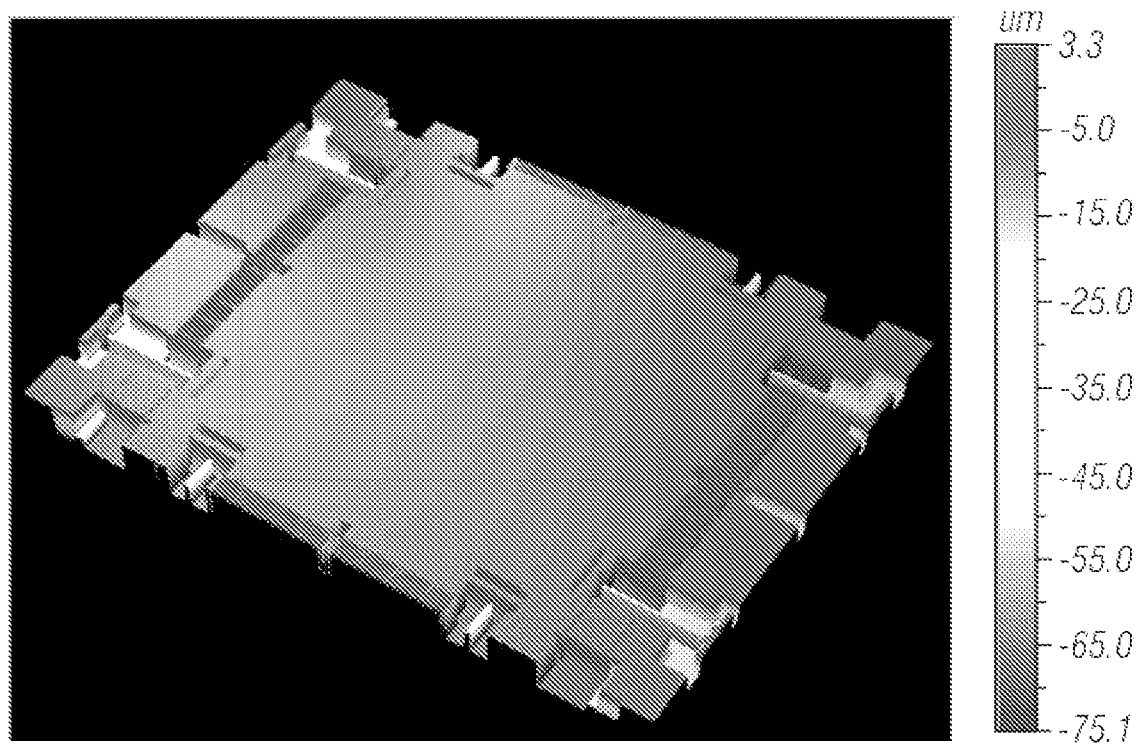
FIG. 1D is a WYKO profile measurement of an exemplary optical device.

Referring to FIG. 1D, the surface profile of a representative reflective layer was determined using a white light interferometer (WYKO NT3300). The radius of curvature was determined to exceed 20 m and its surface-roughness values did not exceed 20 nm.

Figure 1E:
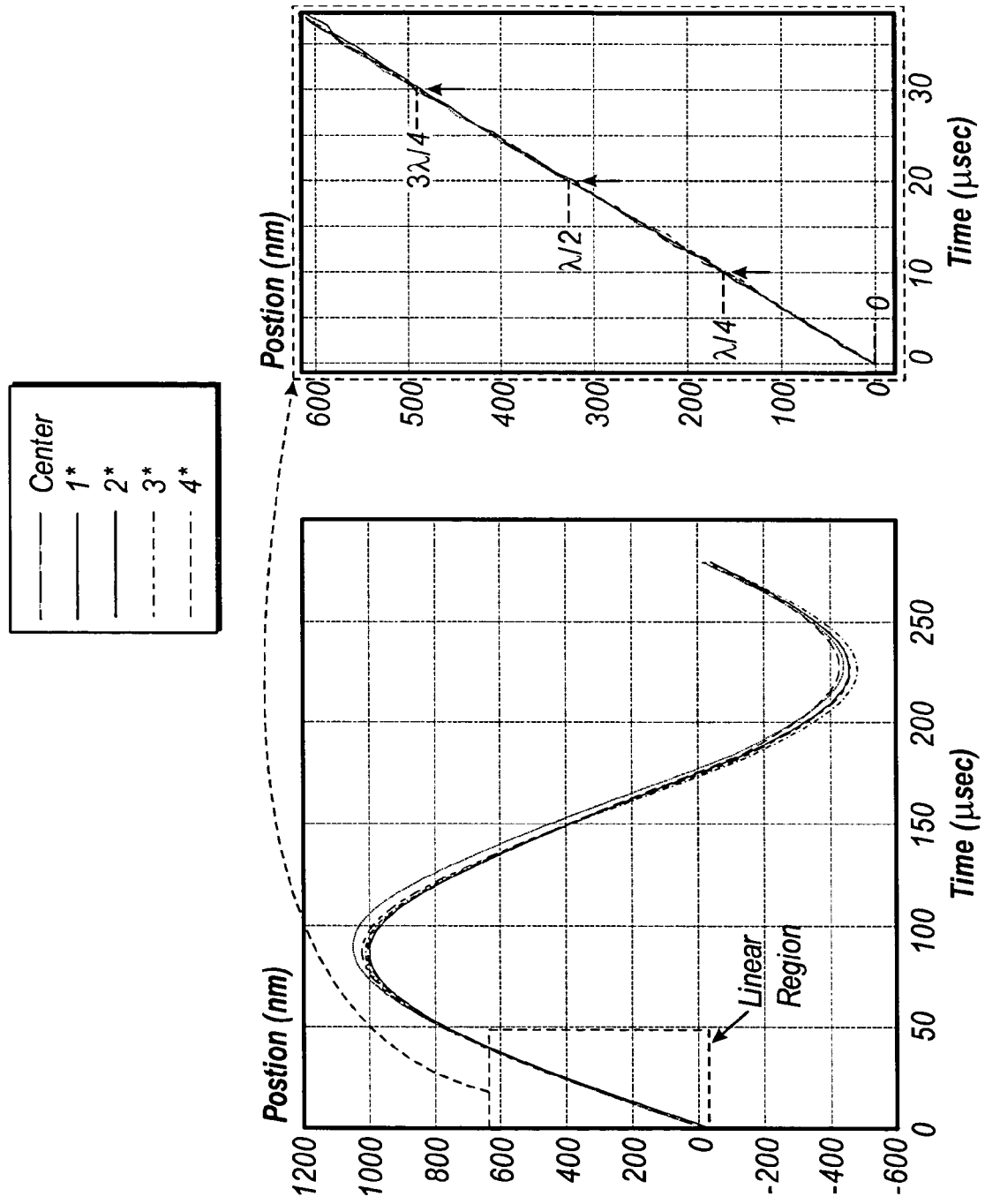
FIG. 1E graphically depicts resonant-motion analysis of an optical device using a calibrated laboratory stroboscopic interferometer.

Referring to FIG. 1E, reflective layer resonance was analyzed using a piezo-based, calibrated stroboscopic interferometer. Dynamic deformation of the reflective layer was determined within the linear region of operation (see FIG. 1E, left panel rectangle and right panel). The measured resonant frequency and mechanical quality factor of the exemplary reflective layer were determined to be about 3.55 kHz and about 63, respectively. At a resonant amplitude of 1.5 µm (actuation voltage=18$V_{ac\_p\text{-}to\text{-}p}$), exemplary delay times for the emission of successive light pulses (about 1 µsec duration) by light source include 0, 10, 20, and 30 µsec delays. Accordingly, when the reflective surface passes the desired phase-shift position the synchronized light source emits a light pulse. A subsequent light pulse is delayed by the appropriate amount of time (e.g., 10 µsec) to allow the reflective surface to pass through the next successive phase-shift position. When measured between the center and the four corners of the reflective layer (see FIG. 1A at positions 1, 2, 3, 4 and center) dynamic deformation was determined to be less than 6 nm (λ/110) (see FIG. 1E, lines labeled 1, 2, 3, 4 and center). Peak-to-peak (e.g., 0, λ/4, λ/2, and 3 λ/4) deviation for positions 1, 2, 3, 4 and center of reflective layer are shown in FIG. 1E, right panel.

Micro electro mechanical systems (MEMS) emerged with the aid of the development of integrated circuit (IC) fabrication processes, in which sensors, actuators, and control functions are co-fabricated in silicon. In general, surface micromachining builds structures on the surface of the silicon by depositing thin films of 'sacrificial layers' and 'structural layers' and by removing eventually the sacrificial layers to release the mechanical structures. The dimensions of these surface micro-machined devices can be several orders of magnitude smaller than bulk-micromachined devices.

Alternatively, optical devices can be fabricated using SOI wafers. The skilled artisan will recognize that such processes generally involve aspects of bulk and surface micromachining techniques. The skilled artisan will also recognize that, in some aspects, the fabrication of an optical device using SOI materials and techniques can provide enhanced optical qualities. For example, devices fabricated using SOI wafers generally provide stiffer, thicker, flatter structural material compared to thin-film devices. Also, electrical isolation between structures is generally enhanced when fabricating devices using SOI techniques in comparison to bulk micromachining.

In addition, silicon-based micromechanical devices can be integrated into microelectronic processing systems such as CMOS (Complementary Metal-Oxide-Semiconductor), as known to one of skill in the art. Accordingly, phase shift interferometric systems provided herein can be cost-effectively manufactured by batch-fabricating control electronics and reflective elements together (e.g., an optical device). Using this technique, miniaturized interferometers and interferometer modules can be fabricated.

An exemplary process for fabricating an optical device 100 is provided in FIG. 2A through 2F. As used herein, the terms "micro electro mechanical systems/structures", "MEMS", "IMEMS", "micromachined structures" and any variations thereof, may generally be understood to comprise any miniature device combining, or otherwise capable of being suitably adapted to combine electrical and/or mechanical components that may be at least partially fabricated with batch-processing techniques. Moreover, the terms "MEMS", "IMEMS", "micromachined structures", "micro electro mechanical systems/structures" and any variations thereof may also be generally understood to comprise any miniature electromechanical device generally requiring at least temporary protection of spatially active elements during, for example, device packaging; whether such devices are now known or hereafter developed or otherwise described in the art. Additionally, use of the term "microelectronic" may generally be understood to refer to any miniature electronic device and/or component that may or may not exhibit micro electro mechanical properties; for example, transistors of an IC element may be understood to comprise "microelectronic" devices that are generally not "micro electro mechanical" (i.e., IC transistors generally do not comprise spatially active elements). The term "film" may be used interchangeably with "coating" and/or "layer", unless otherwise indicated.

Methods for manufacturing a device of the invention include deposition, pattern replication and etching processes known to those skilled in the art of fabricating MEMS devices and integrated circuits (IC). "Patterning" is a process that defines regions for etching features. The feature may be, for example, a sub-micron feature. A feature can be extended into the polymeric material by etching, using, for example, a reactive ion etch process. A suitable etchant may be selected based upon the composition of the polymeric layer. Exemplary etchants include fluorocarbons, hydrofluorocarbons, sulfur compounds, oxygen, nitrogen, carbon dioxide, etc. Generally the feature 60 is aligned with a conductive sub-layer 40 such that contact may be made thereto. For embodiments in which an optional etch stop layer has been formed atop the conductive sub-layer, the etch stop layer may be removed by a suitable etchant in order to expose the conductive sub-layer.

FIG. 2A through 2F provides an exemplary method for manufacturing an optical device as described above. In general, the method includes forming a plurality of layers of materials suitable for use in an optical device as described above. In general the plurality of layers can be formed on a solid substrate suitable for the manufacture of, for example, an integrated circuit. The method further includes selectively patterning materials associated with a particular layer in the plurality of layers. Accordingly, the operation of depositing and patterning can be repeated one or more times to build up a three-dimensional structure from a plurality layers. The method further includes removing the solid substrate.

Figure 2A:
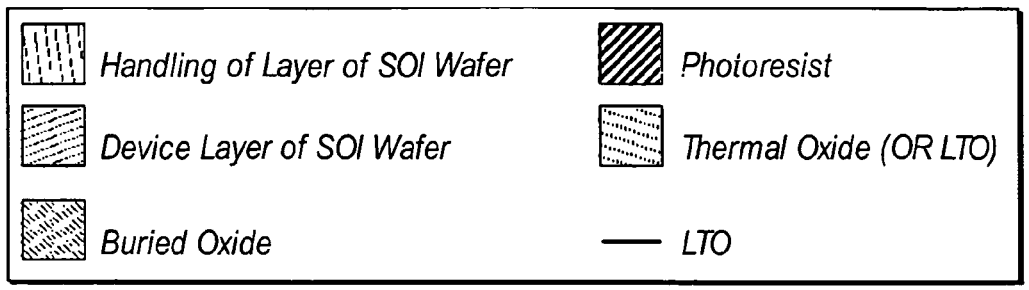
FIGS. 2A through 2F are diagrams depicting a fabrication process for the manufacture of an optical device.
Figure 2A:
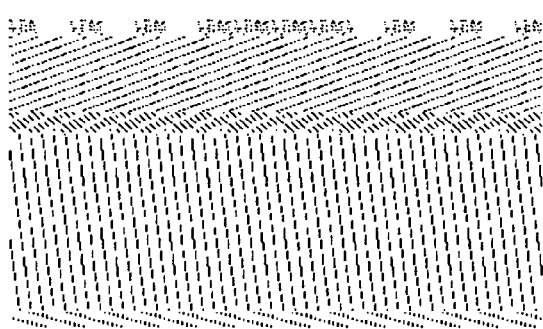
Figure 2B:
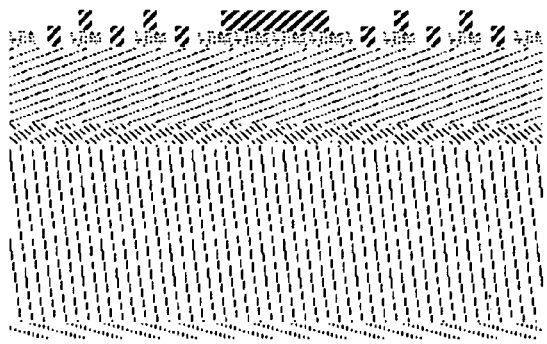
Figure 2C:
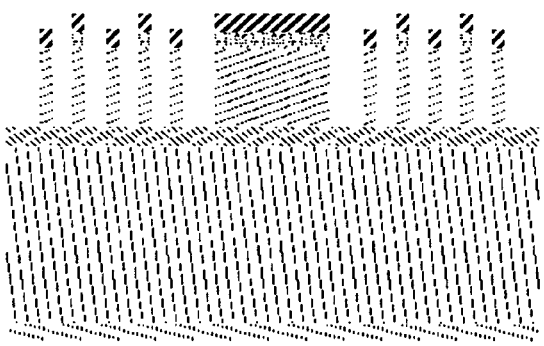
Figure 2D:
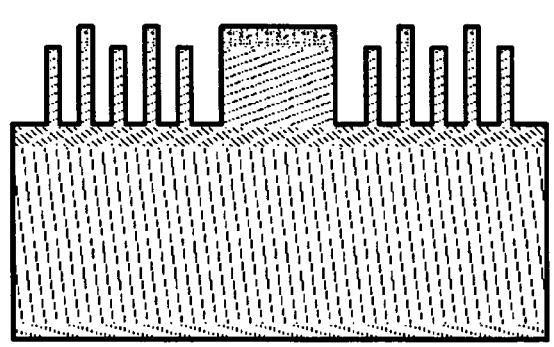
Figure 2E:
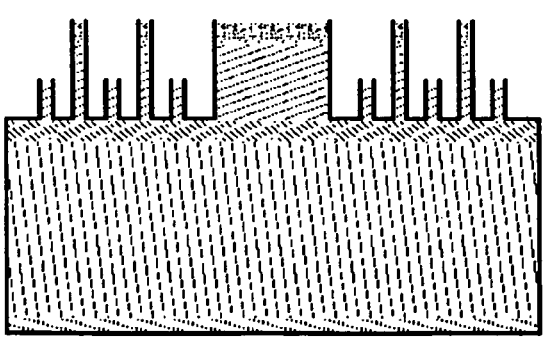
Figure 2F:
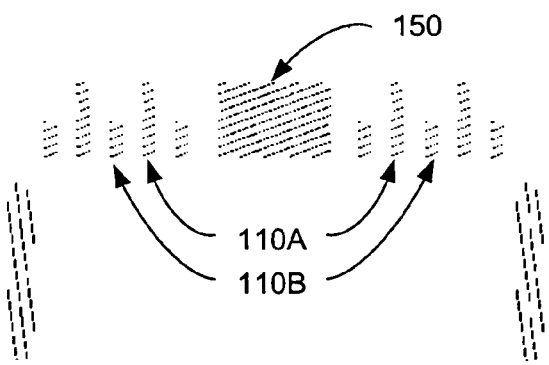

Referring to FIG. 2A, a thermal or low-temperature oxide (LTO) layer is deposited to a depth of approximately 0.5-$\mu$m. A first photolithography mask can be used to pattern and remove the thermal oxide selectively in preparation for fixed comb fabrication. Referring to FIG. 2B, a second photolithography mask can be used to create patterns for the device including movable and non-movable (fixed) combs, flexures, and a reflective layer (e.g., mirror). Referring to FIG. 2C, an etching technique (e.g., deep-reactive-ion-etch (DRIE) can be used to define the reflective surfaces. Referring to FIG. 2D, the second photoresist layer can be removed and a very thin layer (~0.2 $\mu$m) of LTO can be optionally deposited to provide sidewall protection during offset-comb formation. Referring to FIG. 2E, an etching technique (e.g., timed-anisotropic-plasma etch) can be used to remove about 0.2-$\mu$m thick LTO from the top-facing surfaces. Vertically thinned combs are then manufactured by an etching technique (e.g., timed-anisotropic or isotropic silicon-etching). Referring to FIG. 2F, a third photomask can be used to pattern and open the backside of the device.

Figure 3:
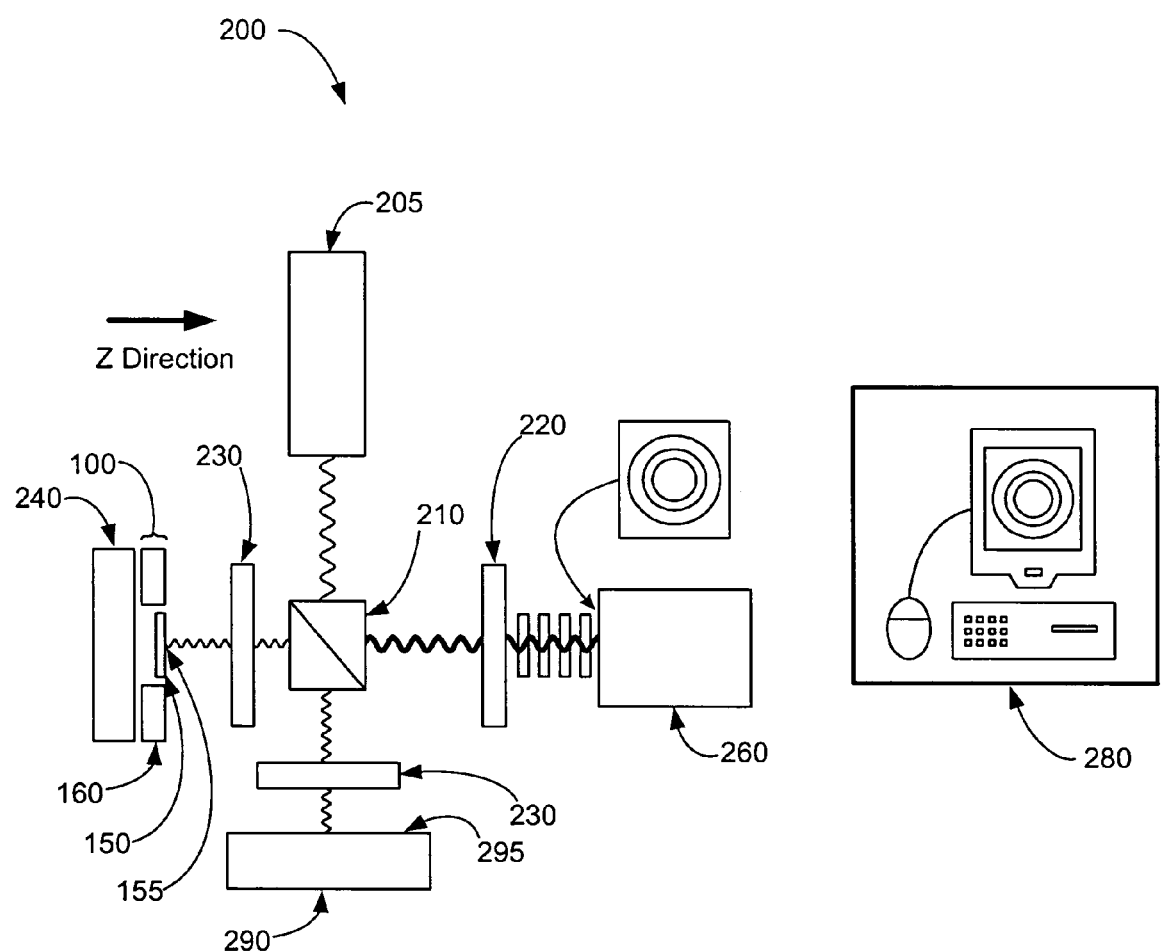
FIG. 3 is a diagram depicting a system that includes an optical device.

A schematic diagram of interferometry system 200 adapted to include optical device 100 is shown in FIG. 3. Interferometry system 200 is configured to measure the optical interference produced by reflections from a test surface 295 of a test object 290, and a surface 155 of a reflective layer 150 associated with optical device 100. System 200 may include a mount for positioning test object 290 relative to beam splitter 210, and an electronic controller 280. System 200 additionally includes a tunable light source 205, a driver connected to light source 205 for adjusting the optical frequency of its output, a beam splitter 210, a detector assembly 260, and a device for storing images detected by detector assembly 260. In some embodiments, a single device can perform both control and measurement functions (e.g., a device for storing images may be incorporated in electronic controller 280). Optionally, the system 200 is adapted to measure the optical interference produced by reflections from a reference surface and to integrate the information derived from the reference surface with information derived from the test surface.

Light source 205 included in interferometry system 200 can be a laser such as a gas, solid-state, tunable dye or semi-conductor laser. The light source can also be a white-light source with a tunable narrow-band spectral filter. Furthermore, in some embodiments the light source can operate at multiple nominal optical frequencies to resolve phase cycling ambiguities in the extracted phase profiles. For example, the light source could operate adjustably between the multiple lines of a HeNe, Argon, or diode laser, or between the different ITU grid frequencies in a commercially available tunable telecom laser. Also, in some embodiments the light source can be coupled to the interferometer by an optical fiber. While the optical frequency of the light source can be tuned externally (e.g., by an optical device described above), it is understood that the optical frequency of the light source can also be tuned internally. For example, the cavity length of a laser light source can be thermally or by piezo-mechanically modulated, to adjust the optical frequency of the laser output. Similarly, the injection current to the gain medium of a laser light source can be modulated to adjust the optical frequency of the laser output.

Throughout the present document the light source is described as a "pulsed" light source. It is understood that "pulsed" as used herein, not only includes periodically turning the light source on and off, but also includes the use of a continuous light source and employing a fast optical shutter to generate pulses. Accordingly, as an alternative to a pulse-capable light source, one can use a continuous light source. In such a system, the detector can incorporate an electronic shutter that captures an interference pattern as the reflective layer is passing a desired phase-shifting position.

Phase measurements can be obtained from a single interference pattern using polarization to provide phase quadrature between orthogonal polarizations in the interference pattern. Interferometry system 200 includes a polarizing beam splitter 210 that separates a beam from a light source 205 (e.g., a laser diode, HeNe laser or the like) into component beams having orthogonal linear polarization states corresponding to a reflected and a transmitted components of the input beam. One beam reflects from surface 155 of the reflective layer 150 associated with optical device 100, while the other reflects from test surface 295 of the test object. In FIG. 3, the reflected component is directed towards a surface 155 of a reflective layer 150 associated with optical device 100, while the transmitted component is directed towards test surface 295 of test object 290. Also as shown in FIG. 3, beam splitter 210 combines light reflected from surface 155 of reflective layer 150 associated with optical device 100 and from test surface 295 of test object 290, and directs the combined light beam to detector assembly 260. Quarter wave plates 230 are positioned in the path of each beam so that the polarization state of each beam is rotated by 90 degrees. This ensures that the beam originally transmitted by PBS 210 is now reflected, and the originally reflected beam, now reflected from test surface 295, is transmitted by the PBS. It is also understood that the above-described method can be implemented using non-polarizing beam splitters.

PBS 210 directs illumination reflected from reflective layer 150 and test surface 295 towards a detector assembly 260. A linear polarizer 220 is positioned between detector assembly 260 and beam splitter 210. Linear polarizer is positioned to ensure that detector assembly 260 receives sample illumination reflected from both reflective layer 150 and test object 290. The detector assembly 260 may optionally include beam splitter(s) to reflect a portion of the incoming illumination from PBS 210 towards multiple detectors simultaneously. Detector assembly 260 may also include lenses which serve to focus and collimate the illumination from PBS 210.

Referring to FIG. 3, interferometry system 200 includes electronic controller 280 in communication with light source 205, optical device 100 and detector assembly 280. During operation, reflective layer 150 resonates such that the optical path length between reflective layer surface 155 and beam splitter 210 is periodically altered. Stable interference patterns are achieved by synchronizing the vertical resonant motion of reflective layer 150 with light pulse emissions from light source 205. Accordingly, phase-shifting is accomplished using vertically resonating reflective layer 150 and light source 205 emitting pulsed light (e.g., laser pulses). System 200 is adapted to include a mechanism for modulating the synchronization process described above. Generally, controller can be adapted to modulate the vertical movement of reflective layer 150 with light pulse emissions from light source 205. In addition, controller can be adapted to synchronize the capture of interference patterns by detector assembly with the vertical movement of reflective layer 150 and light pulse emissions from light source 205. During operation, reflective layer 150 is illuminated by light pulses from light source 205 at a wavelength of about 660 nm ($\lambda$+/−660 nm). The system can be adapted to accommodate a plurality of frames per one profile measurement at a rate of 15-50 profile measurements-per-second. The MBPSI can continuously capture more than 500 profile measurements of a transient phenomenon. In general the number of continuous measurements is limited only by the amount of storage available to store the information generated by the system.

Figure 4:
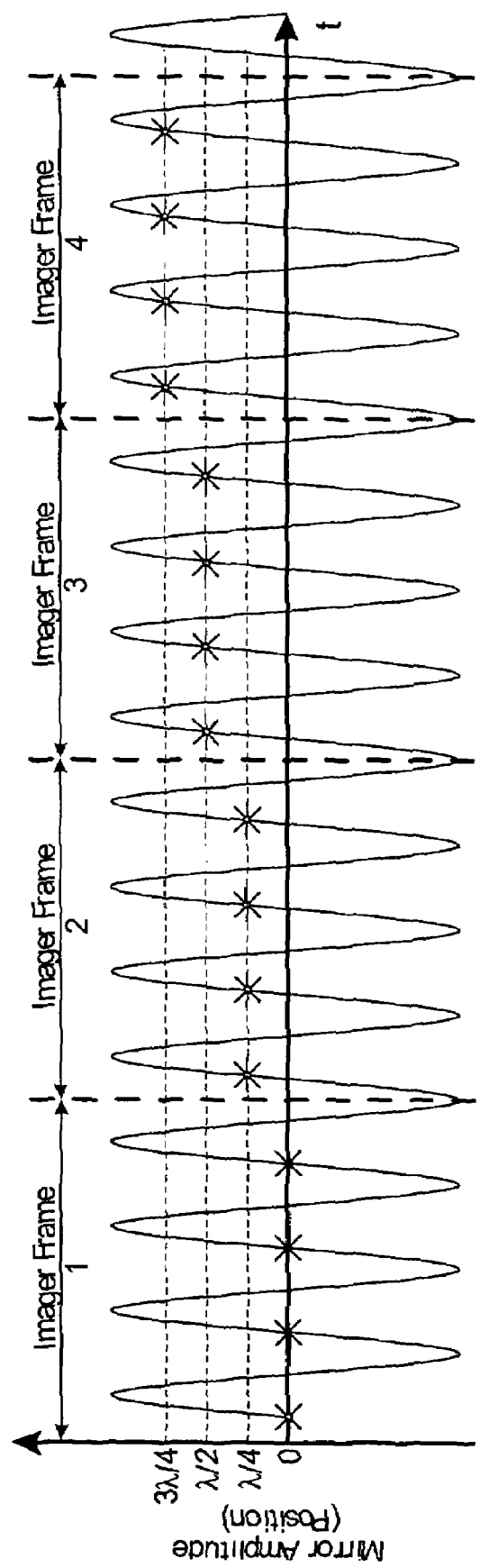
FIG. 4 is a graph depicting phase-shifting and image capture by a system that includes an optical device and a pulsed light source.

Referring to FIG. 4, four exemplary phase steps are graphically depicted. Each step represents a frame of information captured by detector assembly (e.g., a CMOS imager). The interference patterns corresponding to 0, $\lambda/4$, $\lambda/2$, and 3 $\lambda/4$ phase shifts are captured by the detector assembly as frames 1, 2, 3, and 4, respectively. In each frame, while driving the reflective layer at its resonant frequency, the light source is pulsed as the reflective layer is displaced in the Z direction (see FIG. 1A and FIG. 3) from its initial position. Reflective layer displacement in the Z direction corresponds to the desired fraction of the illuminating wavelength (e.g., 0, $\lambda/4$, $\lambda/2$, or 3 $\lambda/4$). The detector integrates images generated by four light pulses (represented by "*" in the graph) flashed for each phase step. Reflected light acquisition by detector can be synchronized with the resonant motion of the reflective layer which is synchronized with the periodic light pulses emitted from the light source. Exemplary delay times for the emission of successive light pulses by light source may include 0, 10, 20, and 30 µsec delays for frames 1, 2, 3 and 4, respectively, as acquired by detector. Accordingly, it is understood that the delay time (i.e., the time between successive light pulses) can be modified according to the rate at which the detector can detect the reflected images. In addition, the exemplary data provides four pulses per frame for illustrative purposes only. It is understood that, during actual operation, the system can generate about 15-25 pulses per frame. The number of pulses per frame generally depends on the resonant frequency of the reflective layer and frame acquisition rate of the detector. In this example, the integrating-bucket technique for CMOS imagers requires that the movement of the phase shifter be linear. Accordingly, as depicted in FIG. 1E, the linear region of the reflective layer's resonant motion is used. When using this technique, the profile-measurement rate is equal to the imager frame rate (fps) divided by the number of phase steps required. As noted previously, the lines designated "center," "1," "2," "3," and "4" in FIG. 1E correspond to elements center, 1, 2, 3, and 4 of FIG. 1A.

The illustrative system can capture 300-700 or profile measurements of a transient phenomenon continuously at a rate of about 15-35 Hz. However, as noted elsewhere in this document, the maximum number of measurements is limited only by the amount of information that can be stored as volatile or non-volatile memory by the system. Further, the rate of data (e.g., image) acquisition is limited only by the rate at which frames of information can be captured by the detector (i.e., the faster the imager frame rate, the faster the measurement rate). Accordingly, a system that includes an optical device described above is suitable for measuring transient optical phenomena of test objects associated with chemical diffusion, crystal growth, and measurements of rapidly varying object temperatures. However, it is understood that the system can measure other objects as well. For example, the object can be an optical flat, a photomask, a flat-panel display, or a silicon wafer (which could involve infrared illumination). Furthermore, the object can be a cemented optic or an air-spaced optical assembly. The object can also be or include a spherical or aspherical dome, contact lens, meniscus lens, or spectacle lens. More generally, the object is any structure which offers optical information relating to surface and/or bulk features of the object. This optical information can relate to the topography of a selected surface of the object or to the optical profile including refractive index homogeneities of all or a selected portion of the object. In addition to accurately identifying transient optical phenomena, the system's rapid measurement rate reduces the data noisiness caused by low-frequency vibrations.

Additional applications for systems and methods provided herein include, but are not limited to: 1) studying nerve signal-transfer properties such as signal/chemical exchanges between nerve cells (e.g., measures the changes in the refractive index in the medium due to the release of signaling chemicals; and 2) studying a cell's bio-physical response to signaling chemicals (mainly the changes in volume/size of the cells—muscle or nerve-cell contractions and/or expansions). Another application includes studying biomechanics in live cells with regard to a) chemical-tissue interactions; b) tissue/cell response to various chemicals/drugs; c) tissue/cell responses due to lesion; d) distinguishing normal and cancer cell growth; e) identifying cell differentiation in stem-cell growth; f) identifying changes during cell apoptosis; g) examining locomotion behavior of single-celled animals; and h) studying hair growth (5 nm/sec) and finger-nail growth (1 nm/sec). Another application includes studying microfluidics in blood vessels by, for example, following pulsing activity in a vessel and/or determining if blood flow is hindered flow inside a vessel. Other applications include the detection of plaque build-up in an artery or vein.

Interferometric systems provided herein can be used in endoscopic medical applications. Because the present systems are fabricated without complex, bulky electronics and transducers, miniaturized, minimally invasive interferometers can be made small enough to be inserted inside human/animal bodies for medical diagnosis and research purposes.

Additional applications in the study of microfluidics includes determining flow rate of a material versus its position inside a microfluidic channel. Also, heat dissipation of a material associated with high-speed semiconductor computing devices, such as Pentium chips, Alpha chips, and graphic chips in action, can be monitored to identify more effective cooling methods. Moreover, material phase changes, such as gas/liquid (condensation), liquid/gas (evaporation), liquid/solid (crystal formation), solid/liquid, solid/gas (sublimation), and gas/solid (precipitation), can be followed in real time by systems and methods described herein. Mechanical changes of materials, such as 1) real-time monitoring of stress/strain development in buckling/cracking materials (for structures under load), 2) transient bending of structures under load, or 3) bubble growth and rupture, can be identified by systems and methods described herein. In addition, interactions and reactions between two different layers, such as two gas layers (e.g., inversion of two layers) or two liquid layers (e.g., water above oil) can be followed.

In addition to accurately identifying transient optical phenomena, the rapid measurement rate of systems and methods described herein can reduce the data noisiness associated with low-frequency vibrations, air turbulence, and ambient temperature and ambient light-level fluctuations that effect phase interferometry applications.

Figure 5:
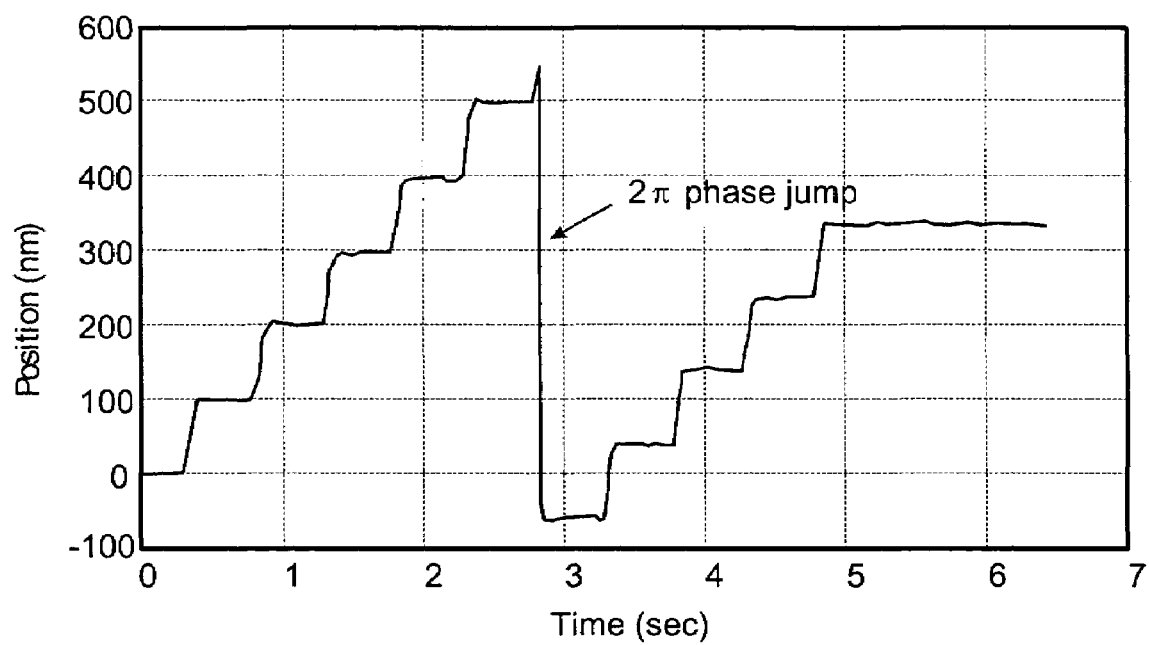
FIG. 5 graphically depicts measurements of the motion of a piezoelectric (PZT) actuator generated by a system that includes an optical device.

Referring to FIG. 5, system 200 in an exemplary Twyman-Green configuration accurately tracked in real time the transient motion of a piezoelectric (PZT) actuator, within $+/-\lambda/110$ ($+/-6$ nm). Measurements were made with an interferometric system similar to that depicted in FIG. 3. The data shows the detection of a PZT actuator moving at a step of 100 nm every 0.5 seconds during a 6.478-second period resulting in 150 continuous measurements in this period of time. It is understood that while the exemplary system provided in FIG. 3 is depicted in a Twyman Green configuration, other embodiments can employ an interferometer of a different type. Such interferometer configurations include Fizeau, Mach Zehnder, Michelson, Fabry-Perot, and grazing-incidence or unbalanced Mirau configurations. Also, the interferometer can be a large aperture, microscope, or fiber optic sensor interferometer.

Interferometry system 200 may optionally include additional optical components such as a collimating lens that collimates diverging light from source 205 before the light is incident on beam splitter 210. Interferometry system 200 may further optionally include beam shaping optics, such as lenses that expand the light reflected by beam splitter 210 prior to contacting test object 290. In general, interferometry systems 200 can include further optical components in addition to collimating lens and beam shaping lenses.

It is understood that detector assembly 280 can be adapted to include any mechanism suitable for detecting an interference pattern generated by a system provided herein. In exemplary embodiments discussed above, the detector assembly is a CMOS (complementary metal oxide semiconductor) imager. As used herein, CMOS refers to both a particular style of digital circuitry design, and the family of processes used to implement that circuitry on integrated circuits. Accordingly, a CMOS imager may include a chip with a large number of CMOS transistors packed tightly together (i.e., a "Complementary High-density metal-oxide-semiconductor" or "CHMOS"). Alternatively, or additionally, a CMOS imager may include a combination of MEMS sensors with digital signal processing on one single CMOS chip (i.e., a "CMOSens"). Additional detectors include, for example, an array of charge coupled devices ("CCDs"), a camera with photosensitive film, or a Vidicon camera.

Controller 280 optionally includes a storage device for storing images detected by detector assembly 260. Controller 280 can further optionally include algorithm(s) for analyzing the images stored by storage device, and provides a user with information about test surface 295 based on the analysis. Briefly, the optical interference patterns can be recorded for each of multiple phase-shifts. The optical interference patterns define a series of intensity values for each spatial location of the pattern, wherein each series of intensity values has a sinusoidal dependence on the phase-shifts with a phase-offset equal to the phase difference between the combined measurement and reference wavefronts for that spatial location. Using numerical techniques known in the art, the phase-offset for each spatial location is extracted from the sinusoidal dependence of the intensity values to provide a profile of the measurement surface relative the reference surface. Such numerical techniques are generally referred to as phase-shifting algorithms. General methodology for data acquisition and reduction to measure the surface topography of an object is known to those skilled in the art. Briefly, after the interferograms are acquired, each can be transformed to provide phase data. The phase data can then be plotted against wave number or spatial frequency to provide a relationship between the two. Additional information can be found in U.S. Pat. No. 5,398,113, the entire contents of which are incorporated herein by reference.

In any of the embodiments described above, controller 280 can be a computer that includes hardware, software, or a combination of both to control the other components of the system and to analyze the phase-shifted images to extract the desired information about the test object. The analysis described above can be implemented in computer programs using standard programming techniques. Such programs are designed to execute on programmable computers each comprising a processor, a data storage system (including memory and/or storage elements), at least one input device, at least one output device, such as a display or printer. The program code is applied to input data (e.g., phase-shifted images from a CMOS imager) to perform the functions described herein and generate information which is applied to one or more output devices. Each computer program can be implemented in a high-level procedural or object-oriented programming language, or an assembly or machine language. Each such computer program can be stored on a computer readable storage medium (e.g., CD ROM or magnetic diskette) that when read by a computer can cause the processor in the computer to perform the analysis described herein.

The examples set forth above are provided to give those of ordinary skill in the art a complete disclosure and description of how to make and use the embodiments of the devices, systems and methods of the invention, and are not intended to limit the scope of what the inventors regard as their invention. Modifications of the above-described modes for carrying out the invention that are obvious to persons of skill in the art are intended to be within the scope of the following claims. All patents and publications mentioned in the specification are indicative of the levels of skill of those skilled in the art to which the invention pertains. All references cited in this disclosure are incorporated by reference to the same extent as if each reference had been incorporated by reference in its entirety individually.

A number of embodiments of the invention have been described. Nevertheless, it will be understood that various modifications may be made without departing from the spirit and scope of the invention. Accordingly, other embodiments are within the scope of the following claims.

What is claimed is:

1. An optical device comprising:
    a) a reflective layer configured to receive at least a portion of pulsed input light from a source;
    b) a base flexibly connected to the reflective layer by flexures, wherein the base comprises a transducer;
    c) an actuator operably associated with the reflective layer and the base; and
    d) a stress modulation structure integrally associated with the reflective layer, wherein said structure is configured to modulate surface non-uniformity associated with the reflective layer.

2. The optical device of claim 1, wherein the actuator is electrostatic comb actuator or a vertical zip actuator, or a combination thereof.

3. The optical device of claim 1, wherein the stress modulating structure is configured to modulate surface non-uniformity by reducing tensile stress associated with reflective layer processing.

4. The optical device of claim 1, wherein the stress modulating structure is configured to modulate surface non-uniformity by reducing stress associated with flexure movement during operation of the optical device.

5. The optical device of claim 1, wherein the transducer is configured to vary an optical path length of pulsed input light reflected from the surface of the reflective layer.

6. The optical device of claim 1, wherein the flexures are positioned to facilitate vertical movement of the reflective surface in relation to the base.

* * * * *